US 6,528,956 B2

(12) United States Patent
Barak

(10) Patent No.: US 6,528,956 B2
(45) Date of Patent: Mar. 4, 2003

(54) ELECTRONIC BALLAST FOR HIGH-INTENSITY DISCHARGE LAMPS

(75) Inventor: Shaul Barak, Ramat Gan (IL)

(73) Assignee: Lightech Electronics Industries Ltd., Lod (IL)

( * ) Notice: Subject to any disclaimer, the term of this patent is extended or adjusted under 35 U.S.C. 154(b) by 0 days.

(21) Appl. No.: 09/985,629

(22) Filed: Nov. 5, 2001

(65) Prior Publication Data

US 2002/0101196 A1 Aug. 1, 2002

(51) Int. Cl.[7] ................................................. G05F 1/00
(52) U.S. Cl. ................ 315/291; 315/247; 315/209 CD; 315/307; 315/224
(58) Field of Search ............................. 315/209 R, 247, 315/224, 291, 307, 244, 219, 209 CD; 363/44, 37, 34

(56) References Cited

U.S. PATENT DOCUMENTS

| 5,144,222 A | | 9/1992 | Herbert |
| 5,569,984 A | * | 10/1996 | Holtslag ..................... 315/307 |
| 5,986,901 A | | 11/1999 | Weng |
| 6,020,691 A | | 2/2000 | Sun et al. |
| 6,034,489 A | | 3/2000 | Weng |
| 6,111,359 A | * | 8/2000 | Work et al. .................... 315/56 |
| 6,271,633 B1 | | 8/2001 | Shen et al. |

FOREIGN PATENT DOCUMENTS

| CA | 2 172 481 A | 9/1997 |
| EP | 0 504 094 A2 | 9/1992 |
| EP | 0 513 920 A2 | 11/1992 |

* cited by examiner

Primary Examiner—Haissa Philogene
(74) Attorney, Agent, or Firm—Browdy and Neimark, P.L.L.C.

(57) ABSTRACT

An electronic ballast for supplying operating power to a high-intensity discharge (HID) lamp. The ballast includes a full-wave rectifier connected to an AC power line to produce an unregulated pulsating DC output which is applied to a power factor correction (PFC) circuit. The PFC circuit includes a first semiconductor electronic switch whose activation is controlled to bring the input current and voltage in time-phase with one another, thereby imparting a high power factor rating to the ballast. The pulsating DC output of the PFC circuit is applied to a storage capacitor circuit which is charged thereby, the capacitor circuit including a second electronic switch whose activation is controlled to discharge the capacitor so as to cause the capacitor circuit to yield in its output, a regulated DC which is fed to a power control (PC) circuit. The PC circuit includes a third electronic switch whose activation is controlled to maintain the wattage of power supplied to the HID lamp at the rated wattage of the lamp.

15 Claims, 3 Drawing Sheets

ELECTRONIC BALLAST FOR HIGH-INTENSITY DISCHARGE LAMPS

FIELD OF THE INVENTION

This invention relates to electronic ballasts adapted to supply operating power to high-intensity discharge lamps.

BACKGROUND OF THE INVENTION AND STATUS OF PRIOR ART

The function of an electronic ballast is to supply the power required for starting and then operating a high-intensity discharge (HID) lamp, such as a metal halide lamp. A metal halide lamp is a high-pressure gas discharge lamp in which metal halides are enclosed in a quartz envelope. Because this lamp has a compact geometry and a high efficacy of nearly white light, it is now widely used to illuminate sports stadiums and roadways. This lamp also has many industrial and domestic applications.

To initiate its operation, a metal halide lamp demands a high ignition voltage. But once an arc discharge is ignited, the lamp is thereafter maintained in operation by a voltage no higher than the voltage of the AC power source to which the ballast is connected. Thus the function of an electronic ballast is to supply to the HID lamp with which it is associated the voltages and currents needed to start and then operate the lamp at its rated wattage.

While a metal halide lamp is notable for its compact geometry, this feature is absent in existing electronic ballasts for supplying power to the lamp, for the typical multi-stage electronic ballast has many magnetic and power components, and these cannot be compactly packaged. The concern of the present invention is with the creation of an electronic ballast for an HID lamp which has fewer magnetic and power components than a standard electronic ballast, yet is compact, highly efficient and reliable in operation.

The efficiency of an electronic ballast in supplying power to an HID lamp largely depends on its power factor rating. Power factor is defined as the real input power level divided by the apparent input power level. The apparent power level, expressed in watts, is determined by the RMS voltage value multiplied by the RMS current value. Power factor is a function of the degree to which the load current and voltage are in time phase with each other. The greater the degree to which the load current leads or lags the voltage, the lower is the power factor rating and the less efficient the ballast.

To provide electronic ballasts for HID lamps that have a high power factor rating, there are disclosed in the Weng U.S. Pat. Nos. 6,034,489 (2000) and 5,986,901 (1999), and in the Sun U.S. Pat. No. 6,020,691 (2000) electronic ballasts which include a power factor correction (PFC) stage. Supplied to this stage is unregulated DC power derived from a bridge rectifier connected to an AC power line. This PFC stage acts to bring the input current substantially in phase with the voltage and in doing so imparts a high power factor rating to the ballast.

The PFC stage disclosed in the above-identified U.S. patents is associated with other ballast stages, such as a power control stage to maintain at a desired level the wattage of power supplied to the HID lamp, and a storage capacitor stage to regulate the DC power supplied to the power control stage. In the capacitor stage, the capacitor acts to store the energy when the line voltage goes below the RMS level.

The various magnetic and power components and the transistors functioning as electronic switches which are entailed by the separate stages of the ballast associated with the PFC stage disclosed in the above-identified patents contribute substantially to the size, weight and cost of the ballast. And the relatively large number of these components precludes the creation of a compact electronic ballast capable of operating a compact HID lamp.

SUMMARY OF THE INVENTION

In view of the foregoing the main object of this invention is to provide an electronic ballast for an HID lamp characterized by a high power factor rating and high efficiency, yet having fewer magnetic and power components than existing ballasts for the same purpose.

More particularly, an object of this invention is to provide an electronic ballast whose power factor correction circuit, storage capacitor circuit, and power control circuit are integrated into a single circuit having relatively few magnetic and power components as compared to the number of components necessary when these circuits are embodied in separate ballast stages. A significant advantage of an electronic ballast in accordance with the invention is that it can be packaged in a compact, light-weight form. Another advantage of the electronic ballast is that it can be mass-produced at relatively low cost.

Briefly stated, these objects are accomplished by an electronic ballast for supplying operating power to a high-intensity discharge (HID) lamp which includes a full-wave rectifier connected to an AC power line to produce an unregulated, pulsating DC output which is applied to a power factor correction (PFC) circuit. The PFC circuit includes a first semiconductor electronic switch whose periodic activation is controlled to bring the input current and voltage more closely in time-phase with one another, thereby imparting a high power factor rating to the ballast.

The pulsating DC output of the PFC circuit is applied to a storage capacitor circuit which is charged thereby, the capacitor circuit including a second electronic switch whose periodic activation is controlled to so discharge the capacitor as to cause the capacitor circuit to yield a regulated DC output. The regulated DC output is fed to a power control (PC) circuit which includes a third electronic switch whose periodic activation is controlled to maintain the power supplied to the HID lamp at the rated wattage of the lamp. The periodic activations of the first, second and third switches are mutually synchronized.

BRIEF DESCRIPTION OF THE DRAWINGS

For a better understanding of the invention as well as other objects and features thereof, reference is made to the annexed drawings wherein.

DETAILED DESCRIPTION OF THE INVENTION

Prior Art Ballast

Figure 1:
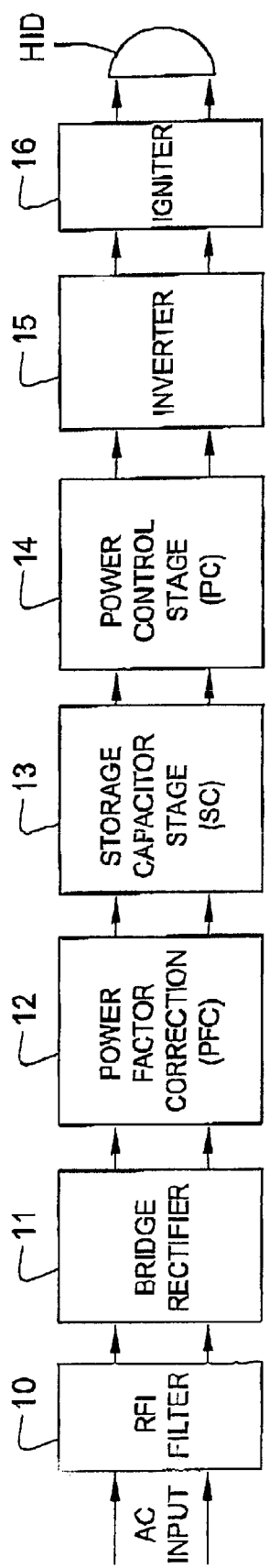
FIG. 1 is a block diagram of a prior art electronic ballast for an HID lamp.

Shown in FIG. 1 is the succession of stages which comprise an electronic ballast of a prior art type. It will be seen that the input to this ballast is connected to an AC power line identified as line AC, and that the output of the ballast is applied to a high-intensity discharge lamp, identified as lamp HID. This lamp may be a metal halide or any other type of high-intensity gas discharge lamp that must be ignited to initiate an arc discharge, such as a mercury or sodium vapor lamp.

Figure 3:
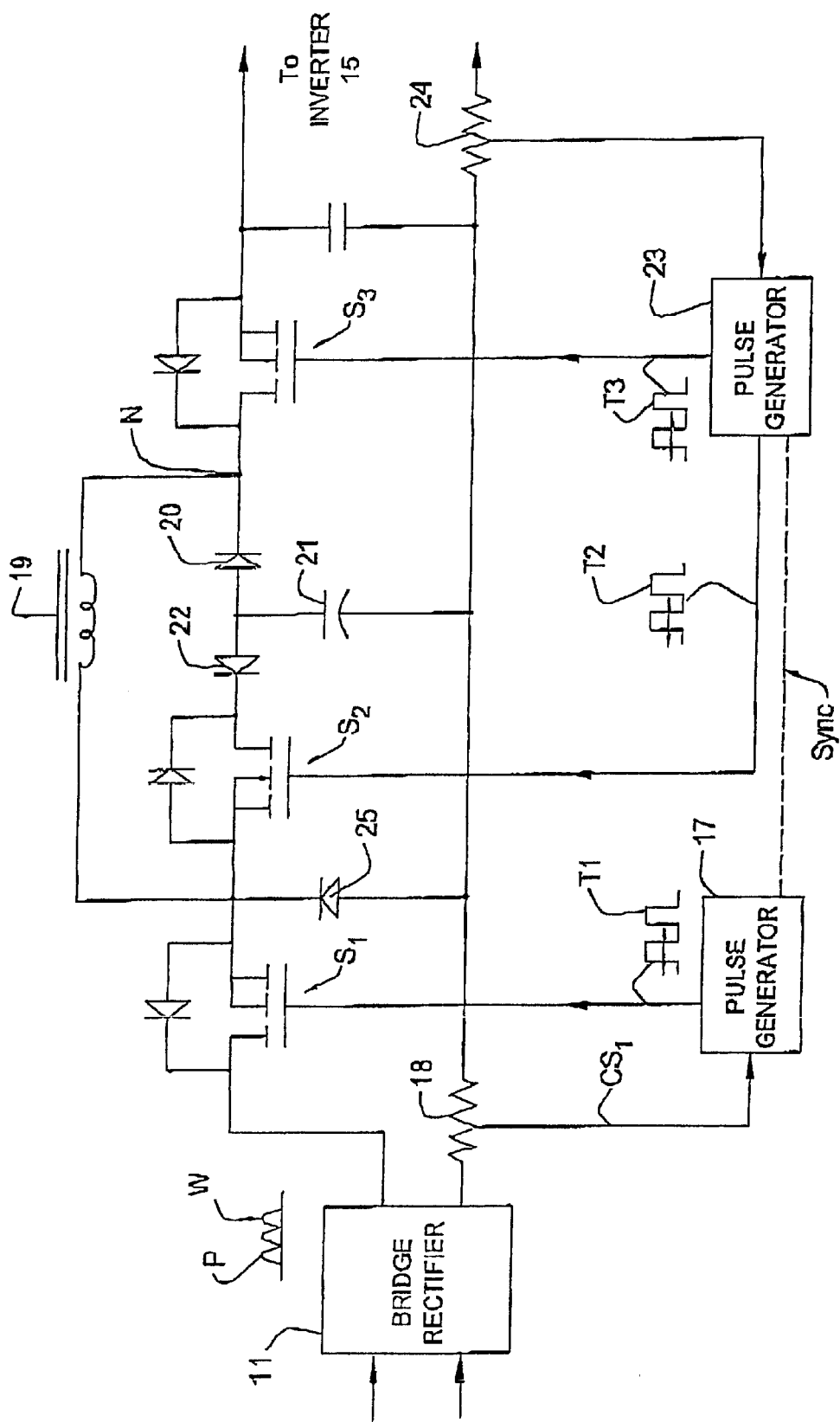
FIG. 3 is a schematic circuit diagram of a ballast in accordance with a first embodiment of the invention.

The specific values of the currents and voltages involved in the prior art electronic ballast shown in FIG. 1, as well as in the ballast shown in FIG. 3, depend on the nature of the power line to which the ballast is connected and on the wattage rating of the HID lamp operated by the ballast. Hence the voltage and current values when the AC power line is a 230 volt, 50 cycle line will be different from the values when the AC line is a 120 volt, 60 cycle line.

Figure 2:
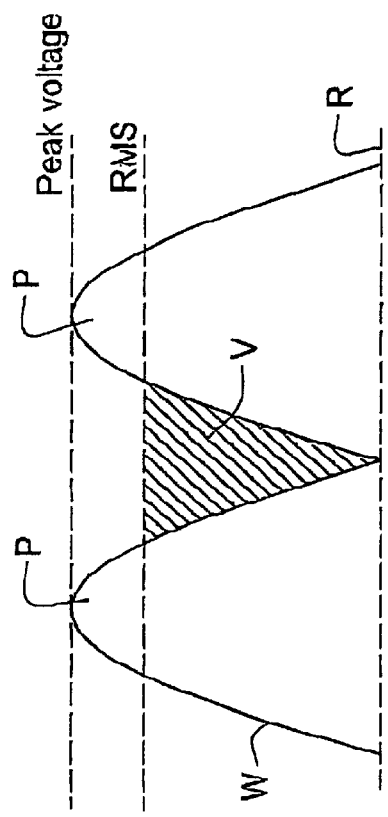
FIG. 2 illustrates the waveform of the pulsatory DC output of the full wave rectifier included in the ballast.

Power from the AC line is fed through the first stage 10 of the electronic ballast, this being an RFI filter to filter out whatever radio-frequency interference or RF noise is conveyed on the line. The output of RFI filter stage 10 is applied to a full-wave diode-bridge rectifier 11. This rectifier yields an unregulated pulsatory DC voltage whose waveform W is illustrated in FIG. 2.

Waveform W consists of a continuous train of half-wave sinusoidal pulses P all having the same polarity and amplitude. Each pulse P rises from a reference level R to a peak level and then returns to this reference level. The number of pulses per second is double the frequency of the AC power line voltage. Hence if the AC power line is a 230 volt, 50 cycle line, then the full-wave rectified output will yield 100 pulses per second, with a peak amplitude of close to 380 volts. Below the peak level of pulses P is the RMS level of 230 volts that reflects the apparent power level. Below the RMS level between successive positive pulses of wave W is a valley V of diminishing power.

The unregulated pulsating DC voltage from bridge rectifier 11 is fed to a power factor correction (PFC) stage 12 which senses the degree to which the input current leads or lags the voltage and then effects a correction thereof in a direction and to an extent imparting to the ballast a high power factor rating, such as 95 percent.

The unregulated, pulsatory in-phase DC output from PFC stage 12 is applied to a storage capacitor (SC) stage 13 whose capacitor is charged thereby and is discharged at timed intervals to yield a regulated DC output in which the valley V in the pulsatory wave W is effectively filled in so that the power yielded by the SC stage approaches the peak level. The function of SC stage 13 is to store energy when the line voltage goes below the RMS level.

Power from SC stage 13 is applied to a power control (PC) stage 14 in which variations in the power supplied to the HID lamp are sensed to produce a control signal which serves to regulate the power supplied to the HID lamp so as to maintain it at the wattage rating of the lamp. Therefore, if the HID lamp has a 60 watt rating, the regulated power supplied thereto by the ballast will be substantially 60 watts of power.

The output of PC stage 14 is fed to an inverter stage 15 which produces square wave pulses that are applied to a resonant circuit in an igniter stage 16 for the lamp. In operation, the abrupt transitions in amplitude at the leading edges of the square wave pulses emerging from the inverter stage act to shock-excite the resonant circuit in the igniter stage, thereby generating high-voltage surges that act to ignite the HID lamp to produce an arc discharge therein.

Hence the prior art ballast has a high power factor rating and functions efficiently to ignite and then operate the HID lamp with which it is associated. However, the number of magnetic and power components dictated by the many stages of this ballast which must be assembled in a package to create a self-sufficient unit, precludes the creation of a highly compact, relatively light-weight unit.

The Invention

In an electronic ballast in accordance with the invention, as shown in FIG. 3, the arrangement is essentially the same as in the prior art ballast shown in FIG. 1 except for one important difference. To this extent, identical components in the two electronic ballasts are referenced by the same abbreviations and reference numerals. In the ballast shown in FIG. 3, PFC stage 12, SC stage 13 and PC stage 14 included in the FIG. 1 ballast are now merged into a single circuit having fewer magnetic and power components than those entailed by separate stages.

Thus the combined PFC, SC and PC stages in FIG. 3 include only three MOSFET transistors functioning as electronic switches S1, S2 and S3. Switch S1 carried out the PFC function of the ballast, switch S2 carried out both SC and PC functions while switch S3 is reserved for PC power control.

A MOSFET is a metal-oxide, field effect semiconductor characterized by high switching speeds. Since in the ballast circuit the electronic switches S1, S2 and S3 are synchronously activated by high-frequency control pulses whose frequency can be as high as 50 KHZ and higher, it is essential that the switches be capable of switching on and off at a very high rate.

In a typical arrangement in accordance with the invention, the pulsatory DC output of bridge rectifier 11 whose waveform W is shown in FIG. 2 is applied to the electronic switch S1 of a power factor correction circuit. This switch is actuated by high-frequency square-wave pulses T1 produced by a pulse generator 17 (constituting a first actuation circuit). This pulse generator as well as other pulse generators included in the ballast circuit, may be constituted by integrated circuit chips.

The periodic square wave pulses T1 from generator 17 which are applied to the gate of the MOSFET electronic switch S1 and act to turn the switch on and off at a high-frequency rate, are pulse width-modulated in accordance with a control signal CS1 derived from a series resistor 18 in the output of bridge rectifier 11. Resistor 18, through which flows the input current to the power factor correction circuit, acts as an input current sensor, and therefore senses the displacement in phase of this current from the voltage.

Pulse width-modulation of the square wave pulses T1 applied to the gate of MOSFET electronic switch S1 varies the duty cycle of the switching action, that is the ratio of the ON time of the switch to its OFF time. Since the duty cycle is varied as a function of the degree and direction in which the input current is displaced in time phase from the voltage, switch S1 serves to bring about a power factor correction of the pulsatory DC power passing through this switch.

The power factor corrected, pulsatory DC power in the output of electronic switch S1 is fed unidirectionally through a choke 19 in series with a diode 20 to storage capacitor 21 of a capacitor charge and discharge circuit, the capacitor being charged by the pulsatory DC wave W. Choke 19 functions as a low pass filter whose useful output is a direct current, as in a power supply rectifier filter.

The storage capacitor circuit acts to modulate the pulsatory DC power applied thereto by effectively filling in the valley V in the pulsatory wave W. This action is carried out by the MOSFET electronic switch S2 which when pulse-activated provides a discharge path through a diode 22, the discharge of capacitor 21 then flowing unidirectionally through diode 22 in series with electronic switch S2 and choke 19 to a node N at the output of the capacitor circuit. Thus capacitor 21 charges through diode 20 when switch S3 is active yet in an off-state and when switch S2 is closed, it then discharges through diode 22. Switch S2 is open when the input voltage is above the RMS value and is pulse-activated when the voltage falls below this value. The voltage of capacitor 21 must be higher than the voltage supplied to the inverter.

The activation of electronic switch S2 is controlled to bring about a discharge in the interval represented by valley V in the pulsatory DC wave W when the wave as shown in FIG. 2 is below the RMS level, thereby effectively redistributing the available DC power.

To effect this action, electronic switch S2 is activated by high-frequency square wave pulses T2 produced by a pulse generator 23 (constituting a second actuation circuit). Pulses T2 are pulse-width modulated by a control signal applied to the generator, this signal being derived from a resistor 24 in a series with the output line through which the load current flows. Hence resistor 24 acts as a load current sensor to provide a control signal that varies with variations in the load current. As a consequence, the duty cycle of electronic switch S2 is controlled whereby the discharge of the charged storage capacitor 21 acts to regulate the DC power yielded at the output node N of the storage capacitor circuit.

The high-frequency pulse generators 17 and 23 operate in synchronism with each other and when the switches S1 and S2 periodically activated by these generators are both open, then current is supplied to choke 19 by a free-wheeling diode 25.

Power form Node N is applied to the inverter 15 of the ballast system through a power control circuit that includes a third electronic MOSFET switch S3 to whose gate is applied pulse-width modulated control pulses T3 derived from the pulse generator 23 (constituting a third actuation circuit). Pulse width modulation of the control pulses T3 is effected by a control signal derived from load current sensor 24. Switch S3 is closed and conductive when the voltage applied thereto is below the RMS value, and switch S2 executes simultaneously pulse-width modulation control. When the voltage is above the RMS value, then switch S3 is activated to execute pulse-width production control of the inverter, switch S2 then being open and inactive.

Thus should the load current decrease to reflect a reduction in the power applied to the HID lamp, the resultant control signal would cause an increase in the width of pulses T3, when the input voltage is below the RMS level, with a resultant increase in the duty cycle of switch S2, when the input voltage is below the RMS level, thereby causing the load current to resume its proper intensity.

The ballast circuit shown in FIG. 3 carries out the same function as the PFC state 12, the SC storage capacitor stage 13 and the PC power control stage 14 in the prior art electronic ballast shown in FIG. 1. But it takes fewer magnetic and power components to do so, for the main components of the ballast circuit in accordance with the invention are three MOSFETs, a storage capacitor, a choke and three diodes, there being no transformer or other cumbersome parts. It therefore becomes possible to manufacture a highly compact and light weight electronic ballast unit for an HID lamp in which the magnetic and power components of the ballast are fewer in number and smaller than those included in a conventional ballast and therefore can be packaged and potted in a small casing.

As noted, in the ballast circuit shown in FIG. 3, the second and third actuation switches share a common pulse generator 23 for applying respective pulses to the MOSFETs S2 and S3. In this respect, a single actuation circuit actually serves to control both MOSFETs S2 and S3. However, separate actuation switches may also be employed if desired.

Figure 4:
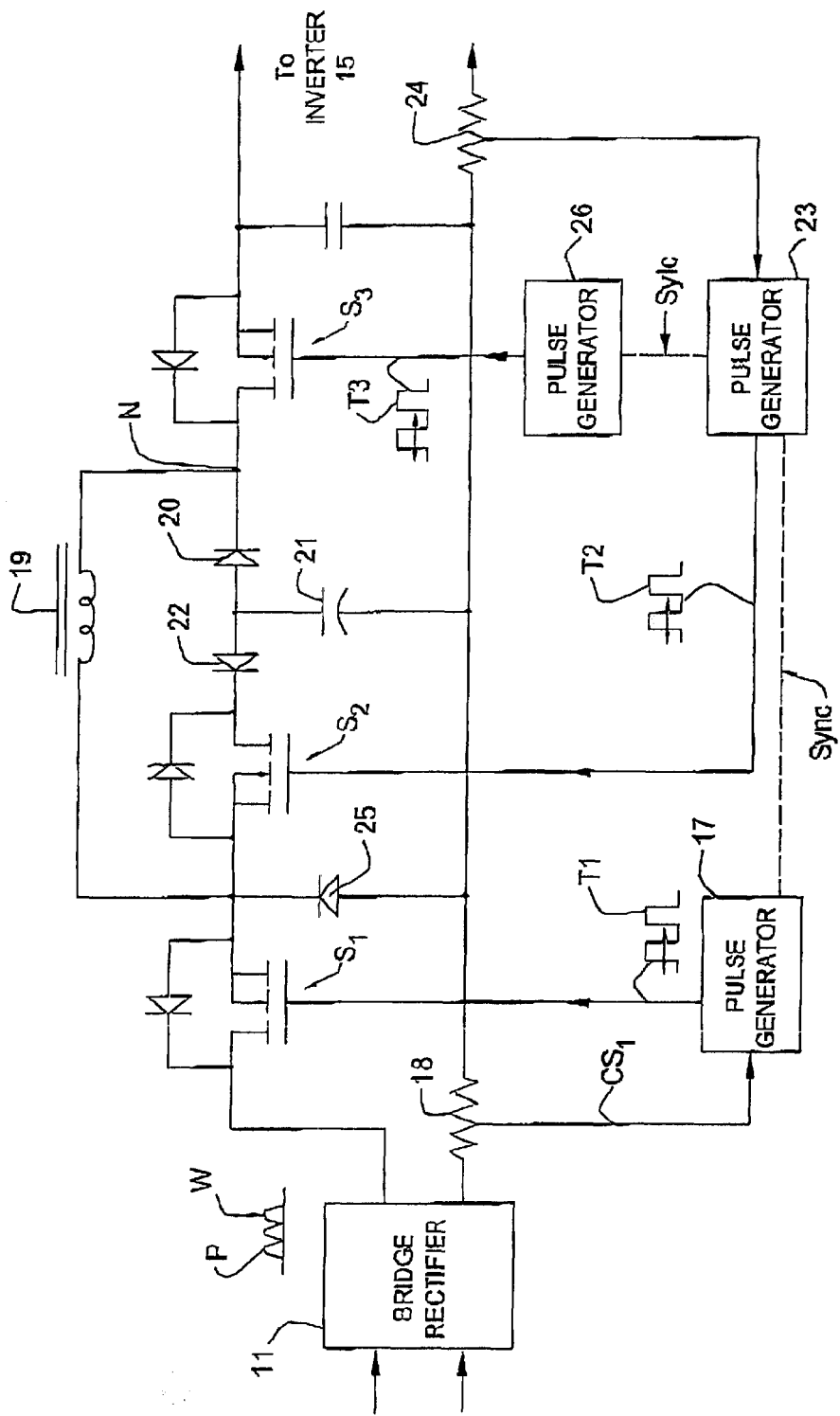
FIG. 4 is a schematic circuit diagram of a ballast in accordance with a second embodiment of the invention.

FIG. 4 shows a ballast that is identical in construction and operation to the ballast described above with reference to FIG. 3 apart from the fact that the third actuation switch includes a third pulse generator 26 for feeding the pulses S3 to the MOSFET S3 in sync with the pulses S2 fed by the second pulse generator 23 to the second MOSFET S2.

While there has been shown a preferred embodiment of an electronic ballast in accordance with the invention, it is to be understood that other changes may be made therein without departing from the scope of the invention as defined by the claims.

Thus, when an electronic ballast in accordance with the invention is designed to operate a DC powered HID lamp, it will then not include an inverter to supply AC to an igniter as in FIG. 1. The igniter to be included in an electronic ballast for a DC powered HID lamp must be one appropriate to this DC lamp. Moreover, an RFI filter for the AC supply, as shown in FIG. 1, is not essential to an electronic ballast in accordance with the invention.

What is claimed is:

1. An electronic ballast adapted to supply operating power to a high-intensity discharge lamp having a specified rated wattage; said ballast comprising:

a full wave rectifier for connecting to an AC power line to produce an unregulated pulsatory DC output;

a power factor correction circuit coupled to an output of the rectifier, said power factor correction circuit being provided with a first electronic switch to which the output is applied, and further including a first actuation circuit for periodically activating the first electronic switch and varying its duty cycle to yield an unregulated DC power output whose voltage is substantially in phase with its current, thereby imparting a high power factor rating to the ballast;

a storage capacitor circuit to which is applied the output of the power factor correction circuit so as to charge a capacitor in the storage capacitor circuit the storage capacitor circuit including a second electronic switch which when activated functions to discharge the capacitor, and a second actuation circuit for periodically activating the second switch and varying its duty cycle, so as thereby to produce in the output of the capacitor circuit a regulated DC power output, and a power control circuit coupled to the output of the storage capacitor circuit, said power control circuit including a third electronic switch which when activated supplies power to the lamp, and a third actuation circuit for periodically activating the third switch and varying its duty cycle so as to maintain the power supplied to the lamp at the rated wattage of the lamp.

2. The ballast as set forth in claim 1, in which pulse activations of the first, second and third switches are mutually synchronized.

3. The ballast as set forth in claim 1, in which the rectifier is a diode bridge rectifier.

4. The ballast as set forth in claim 1, in which the lamp is a metal halide lamp.

5. The ballast as set forth in claim 1, in which the lamp is a mercury vapor lamp.

6. The ballast as set forth in claim 1, in which the first, the second and the third electronic switches are each constituted by a MOSFET.

7. The ballast as set forth in claim 1, in which the output of the power control circuit is fed to an inverter that produces periodic pulses that are applied to an igniter to ignite the lamp.

8. The ballast as set forth in claim 1, in which the first actuation circuit includes a pulse generator producing high-frequency square wave pulses whose width is modulated to vary the duty cycle of the first switch.

9. The ballast as set forth in claim 8, which includes an input current sensor for sensing the input current to the power factor correction circuit and producing a control signal that is applied to said pulse generator to modulate the width of the pulses produced thereby.

10. The ballast as set forth in claim 1, in which the second actuation circuit includes a second pulse generator producing high-frequency square wave pulses whose width is modulated to vary the duty cycle of the second switch.

11. The ballast as set forth in claim 1, in which the third actuation circuit includes a third pulse generator producing high-frequency square-wave pulses whose width is modulated to vary the duty cycle of the third switch.

12. The ballast as set forth in claim 11, in which the third pulse generator is controlled by a signal derived by a load current sensor whereby the pulse width is modulated as a function of variations in load current.

13. The ballast as set forth in claim 12, in which the capacitor is charged through a choke.

14. The ballast as set forth in claim 11, in which said third pulse generator operates in synchronism with said second pulse generator.

15. The ballast as set forth in claim 1, in which the third actuation circuit is integral with the second actuation circuit.

\* \* \* \* \*